(12) United States Patent
Wu (10) Patent No.: US 9,345,193 B2
(45) Date of Patent: May 24, 2016

(54) DIRECT DRIVE ELECTRIC LAWN MOWER

(76) Inventor: Hui-Yi Wu, Taoyuan (TW)

( * ) Notice: Subject to any disclaimer, the term of this patent is extended or adjusted under 35 U.S.C. 154(b) by 957 days.

(21) Appl. No.: 13/560,030

(22) Filed: Jul. 27, 2012

(65) Prior Publication Data

US 2014/0026529 A1    Jan. 30, 2014

(51) Int. Cl.
*H02K 11/00* (2006.01)
*H02K 7/14* (2006.01)
*A01D 34/08* (2006.01)
*A01D 34/00* (2006.01)
*A01D 34/78* (2006.01)
*A01D 34/90* (2006.01)
*A01D 34/416* (2006.01)

(52) U.S. Cl.
CPC ................ *A01D 34/78* (2013.01); *A01D 34/90* (2013.01); *A01D 34/4165* (2013.01)

(58) Field of Classification Search
CPC ... A01D 34/00; A01D 34/78; A01D 34/4165; A01D 34/416; A01D 34/68; A01D 34/6806; A01D 34/475; A01D 34/733; A01D 34/90; A01D 34/81; A01D 69/02; A01D 37/733; A01D 34/69; A01D 34/006; A01D 34/008; A01G 3/062; A01G 3/67; A01G 3/06; H02K 1/187; H02K 1/2786; H02K 1/28; H02K 21/21; H02K 21/22; H02K 7/1016

USPC ............. 310/88, 50, 156.08, 156.01, 156.09, 310/156.13, 67 R; 56/10.8, 11.1, 11.9, 12.8, 56/12.7; 172/13.7, 16.9, 42.56, 41; 173/167; 30/347, 286, 422, 85
See application file for complete search history.

(56) References Cited

U.S. PATENT DOCUMENTS

| | | | | |
|---|---|---|---|---|
| 4,047,299 A | * | 9/1977 | Bair | 30/276 |
| 4,249,310 A | * | 2/1981 | Secoura et al. | 30/276 |
| 5,713,191 A | * | 2/1998 | Welton | 56/12.1 |
| 8,049,381 B2 | * | 11/2011 | Lu | 310/67 R |
| 2009/0196773 A1 | * | 8/2009 | Jiang et al. | 417/423.14 |
| 2010/0090554 A1 | * | 4/2010 | Yano et al. | 310/156.01 |
| 2011/0241457 A1 | * | 10/2011 | Muller et al. | 310/50 |
| 2012/0152577 A1 | * | 6/2012 | Mattson et al. | 173/1 |
| 2013/0187500 A1 | * | 7/2013 | Bailey et al. | 310/91 |

* cited by examiner

*Primary Examiner* — Jose Gonzalez Quinones (57) ABSTRACT

A direct drive electric lawn mower includes a driving device using an outer rotor electric motor formed of a stator, a rotor, a holder base, a bottom cap and a shaft, a cutting device connected to the shaft of the driving device outside the bottom cap and rotatable with the shaft and the bottom cap to cut a lawn at an even height, and an operating device including a tubular handle connected to the driving device, an electrical connector located on one end of the tubular handle remote from the driving device, a grip affixed to the handle and a switch mounted at the tubular handle and electrically connected with the electrical connector and operable to switch on/off the outer rotor electric motor of the driving device.

17 Claims, 7 Drawing Sheets

DIRECT DRIVE ELECTRIC LAWN MOWER

BACKGROUND OF THE INVENTION

1. Field of the Invention

The present invention relates to lawn mower technology and more particularly, to a direct drive electric lawn mower, which uses an outer rotor electric motor to provide a large torque for rotating a cutting device to cut a lawn at an even height efficiently.

2. Description of the Related Art

The engine of a lawn mower consumes gasoline or diesel during operation. When burning gasoline or diesel during the operation of a lawn mower engine, much waste gas (such as: sulfur dioxide, carbon monoxide) will be produced to pollute the air. In order to meet environmental protection requirements, a power lawn mower may use a carbon brush motor to substitute for a gasoline or diesel engine for rotating the cutter. Because a carbon brush motor consumes city power supply or battery power supply, it does not release waste gas during operation. The carbon brushes of a carbon brush motor are electromechanical conducting devices that connect to moving parts to provide an electric current. The carbon brushes of a carbon brush motor for lawn mower run on direct current (DC). However, a carbon brush motor does not allow conduction of a high current. The limited output of a DC carbon brush motor requires a reduction gear to enhance the torque. Short service life and low performance are the drawbacks of DC carbon brush motors.

SUMMARY OF THE INVENTION

The present invention has been accomplished under the circumstances in view. It is the main object of the present invention to provide a direct drive electric lawn mower, which is environmentally friendly, and uses an outer rotor electric motor to provide a large torque for rotating a cutting device to cut a lawn at an even height efficiently.

To achieve this and other objects of the present invention, a direct drive electric lawn mower comprises a driving device, a cutting device, and an operating device. The driving device comprises an outer rotor electric motor and a connection member. The outer rotor electric motor comprises a stator, a rotor arranged around the stator, a holder base affixed to the top side of the stator and connected to the connection member, a bottom cap connected to the bottom side of the rotor, and a shaft mounted in the holder base and extending out of the bottom side of the bottom cap and rotatable with the bottom cap by the rotor. The cutting device is connected to the shaft of the driving device outside the bottom cap and rotatable with the shaft and the bottom cap to cut a lawn at an even height. The operating device comprises a tubular handle connected to the connection member of the driving device, an electrical connector located on one end of the tubular handle remote from the driving device, a grip affixed to the handle, and an on/off switch mounted at the tubular handle and electrically connected with the electrical connector and the outer rotor electric motor of the driving device.

DETAILED DESCRIPTION OF THE PREFERRED EMBODIMENT

Referring to FIGS. 1-6, a direct drive electric lawn mower in accordance with a first embodiment of the present invention is shown. The direct drive electric lawn mower comprises a driving device 1, a cutting device 2, and an operating device 3.

The driving device 1 comprises an external rotor electric motor 11, and a connection member 12. The external rotor electric motor 11 comprises a stator 111, which defines therein an axial mounting hole 1111 and a locating groove 1112 in the wall of the axial mounting hole 1111, a rotor 112, which comprises an annular shell 1121 arranged around the stator 111, and a plurality of magnets 1122 equiangularly inserted in the annular shell 1121 and kept in proximity to the periphery of the stator 111, a holder 113 fastened to one side (the top side) of the stator 111 and having a center tube 1131 inserted into the axial mounting hole 1111 of the stator 111 and a locating groove 1132 longitudinally located on the periphery of the center tube 1131 corresponding to the locating groove 1112 of the stator 111, two bearings 117 respectively inserted in opposing top and bottom ends of the center tube 1131 of the holder 113, a key 116 engaged into the locating groove 1112 and the locating groove 1132 to prohibit relative rotation between the stator 111 and the holder 113, a bottom cover 114, which comprises a flat body 1141 attached to the opposite side (the bottom side) of the stator 111 and defining a cross-notched center hole 1143, a plurality of locating rods 1142 equiangularly and upwardly extended from the border of the flat body 1141 and respectively inserted into the inside of the annular shell 1121 of the rotor 112 between each two adjacent magnets 1122, a shaft 115 inserted through the center tube 1131 of the holder 113 to the outside of the bottom cover 114 and coupled to the two bearings 117, a connector 118 fastened to one end (the top end) of the shaft 115 and supported on the bearing 117 at the top side of the holder 113, and a limiter pin 119 transversely fastened to the shaft 115 and inserted in the cross-notched center hole 1143 to prohibit relative rotation between the bottom cover 114 and the shaft 115. The connection member 12 comprises a shield 121, a plurality of mounting apertures 1211 cut through opposing top and bottom sides of the shield 121, and a shank 122 extended from the shield 121.

Figure 6:
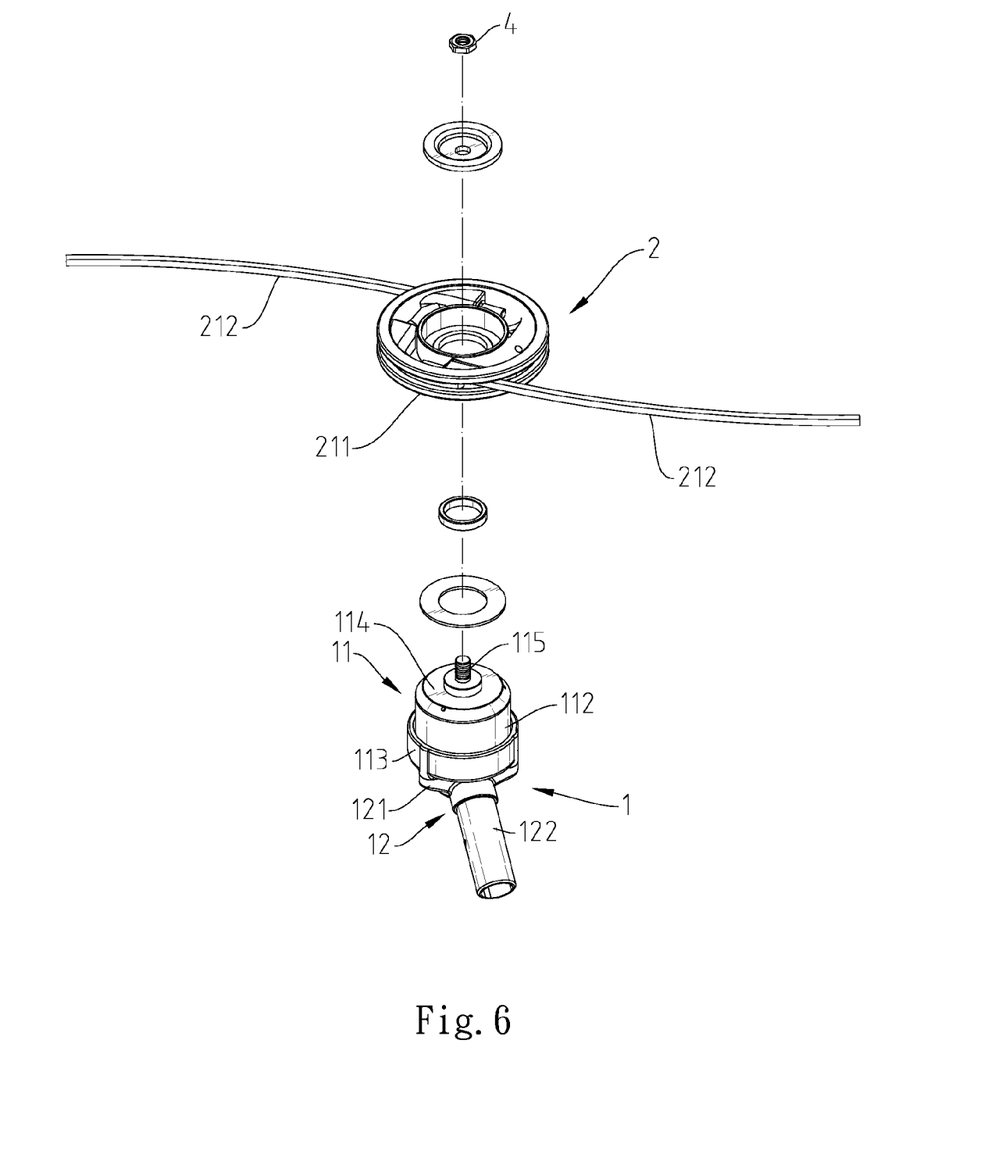
FIG. 6 is an exploded view of a part of the direct drive electric lawn mower in accordance with the first embodiment of the present invention, illustrating the structure of the cutting device and the relationship between the cutting device and the driving device.

The cutting device 2 comprises a rotary cutter 21. The rotary cutter 21 comprises a wheel 211, and at least one, for example, two ropes 212 connected to the wheel 211 at two opposite sides. Further, the wheel 211 is arranged around the bottom end of the shaft 115 outside the bottom cover 114 with fastening components 4.

Figure 1:
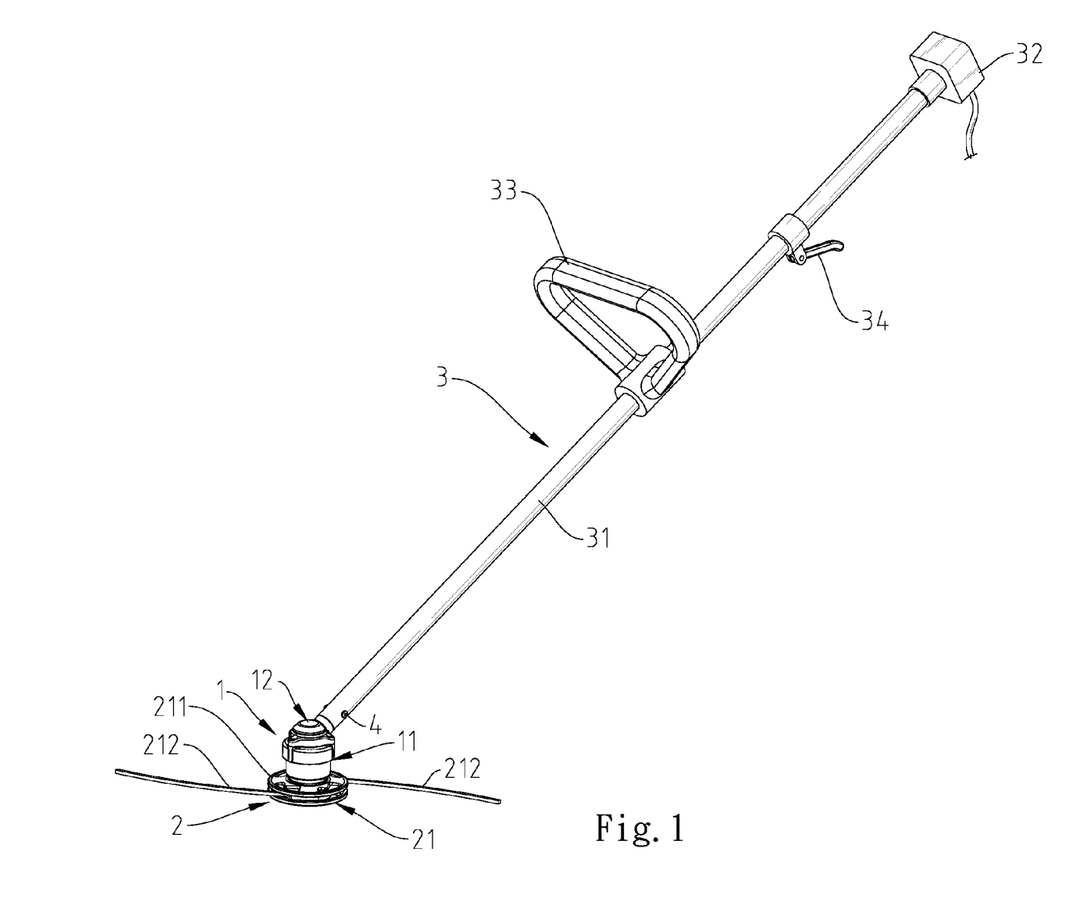
FIG. 1 is an elevational view of a direct drive electric lawn mower in accordance with a first embodiment of the present invention.
Figure 2:
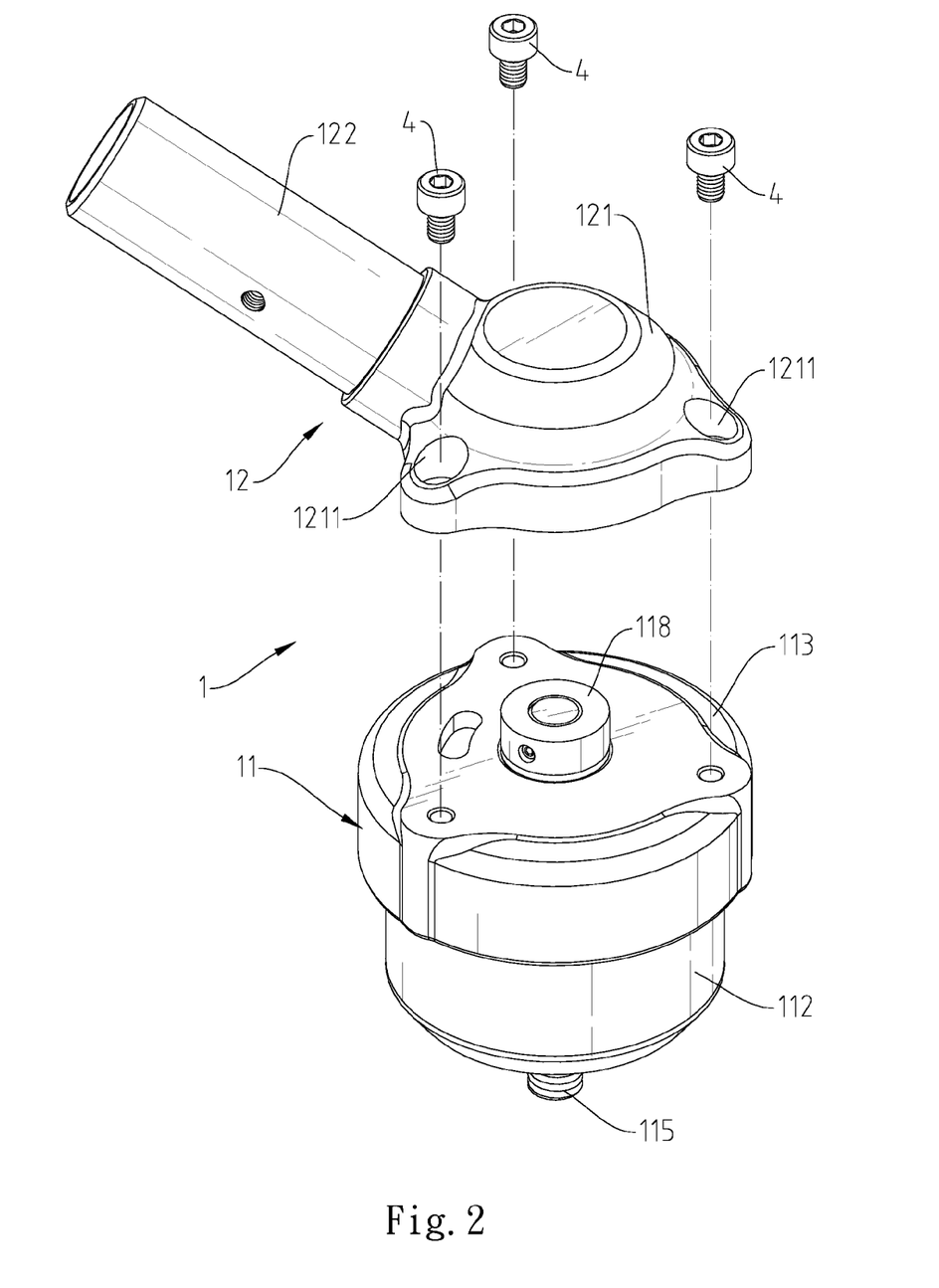
FIG. 2 is an exploded view of a part of the direct drive electric lawn mower in accordance with the first embodiment of the present invention, illustrating the relationship between the outer rotor electric motor and connection member of the driving device.
Figure 3:
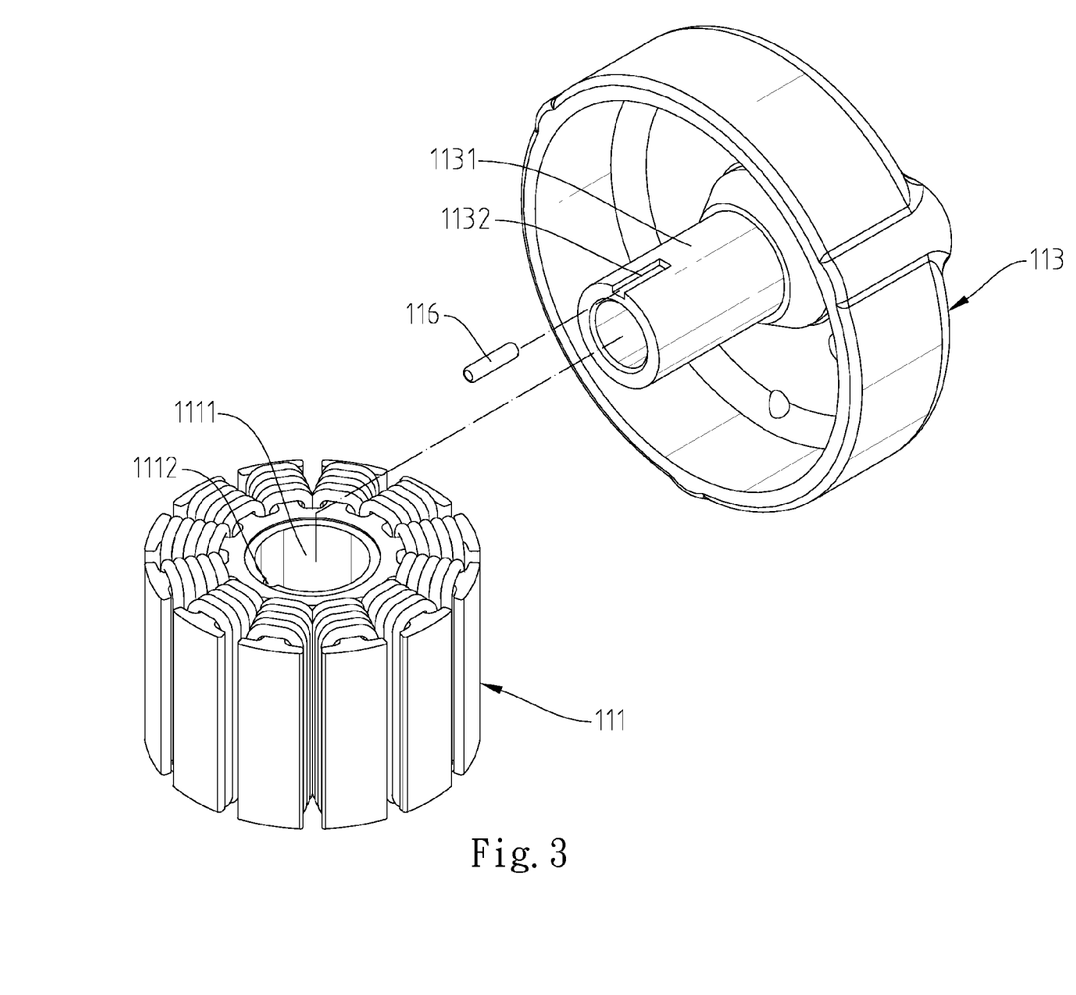
FIG. 3 is an exploded view of a part of the direct drive electric lawn mower in accordance with the first embodiment of the present invention, illustrating the relationship between the stator and holder base the outer rotor electric motor and connection member of the driving device.
Figure 4:
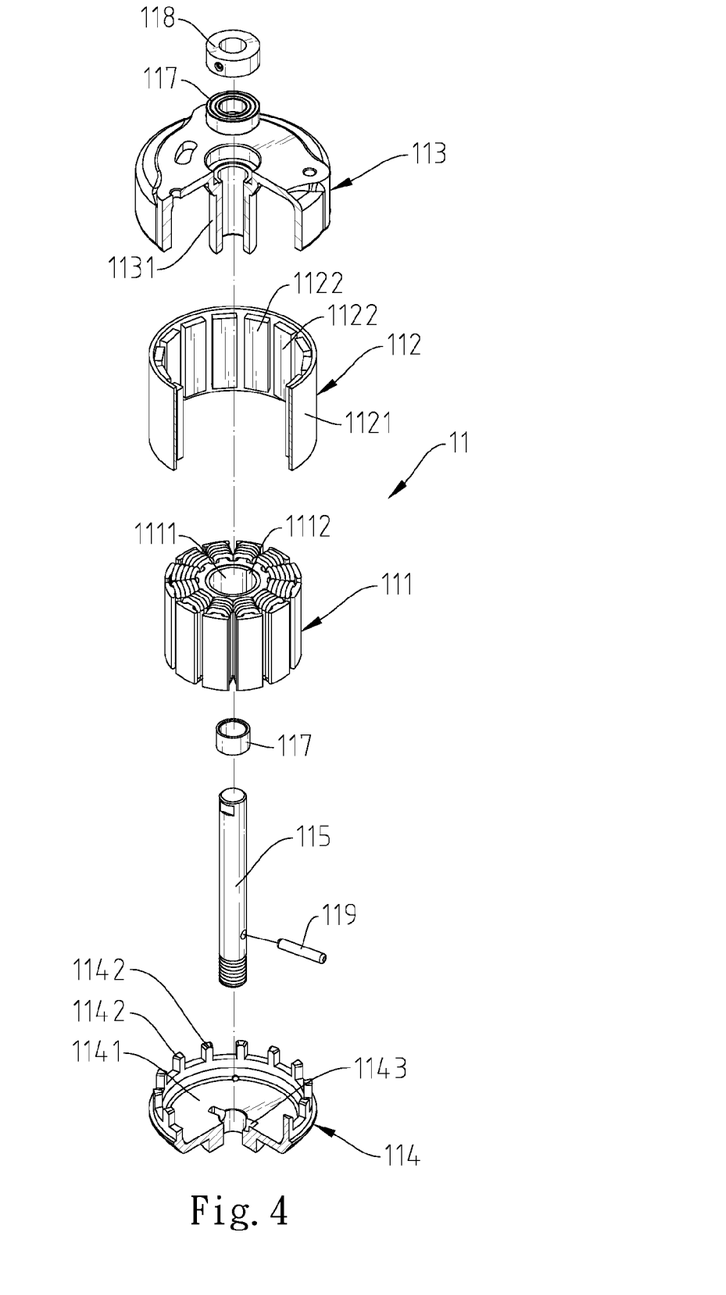
FIG. 4 is an exploded, sectional elevational view of the outer rotor electric motor of the direct drive electric lawn mower in accordance with the first embodiment of the present invention.
Figure 5:
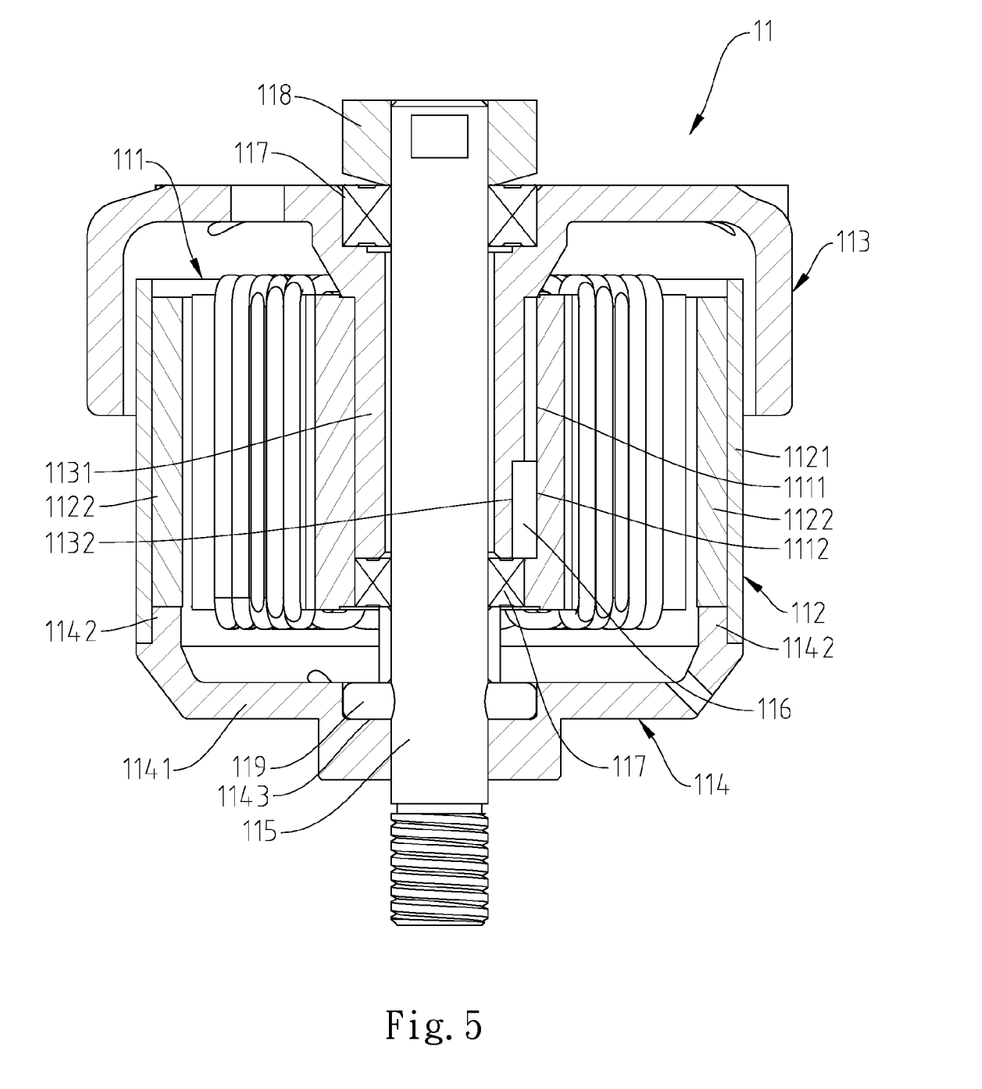
FIG. 5 is a sectional plain view of the outer rotor electric motor of the direct drive electric lawn mower in accordance with the first embodiment of the present invention.

The operating device 3 comprises a tubular handle 31, an electrical connector 32 located on one end, namely, the top end of the tubular handle 31, a grip 33 affixed to the handle 31, and an on/off switch 34 mounted at the tubular handle 31.

When assembling the direct drive electric lawn mower, the shield 121 of the connection member 12 is attached to the top side of the holder 113 of the external rotor electric motor 11 of the driving device 1 and then the shield 121 is secured to the holder 113 with fastening components 4 inserted in the mounting apertures 1211. Then, the shank 122 of the connection member 12 is press-fitted into the bottom end of the tubular handle 31 of the operating device 3 before they are bonded by inserting a fastening component 4 therein. Then, the electrical connector 32 and the on/off switch 34 are electrically connected to the external rotor electric motor 11 of the driving device 1, and then the wheel 211 of the rotary cutter 21 is pressed against the bottom cover 114 by engaging a fastening component 4 with the bottom end of the shaft 115. Thus, the direct drive electric lawn mower is assembled, as shown in FIG. 1. Furthermore, the electrical connector 32 of the operating device 3 is electrically connected to a power supply device (not shown). When using the direct drive electric lawn mower, switch on the on/off switch 34 of the operating device 3 to start the external rotor electric motor 11 of the driving device 1, causing the rotor 112 of the external rotor electric motor 11 to rotate the bottom cover 114 and the shaft 115. At this time, the wheel 211 of the rotary cutter 21 cutting device 2 is rotated by the rotor 112 of the external rotor electric motor 11 of the driving device 1, moving the ropes 212 of the rotary cutter 21 to cut a lawn at an even height.

Figure 7:
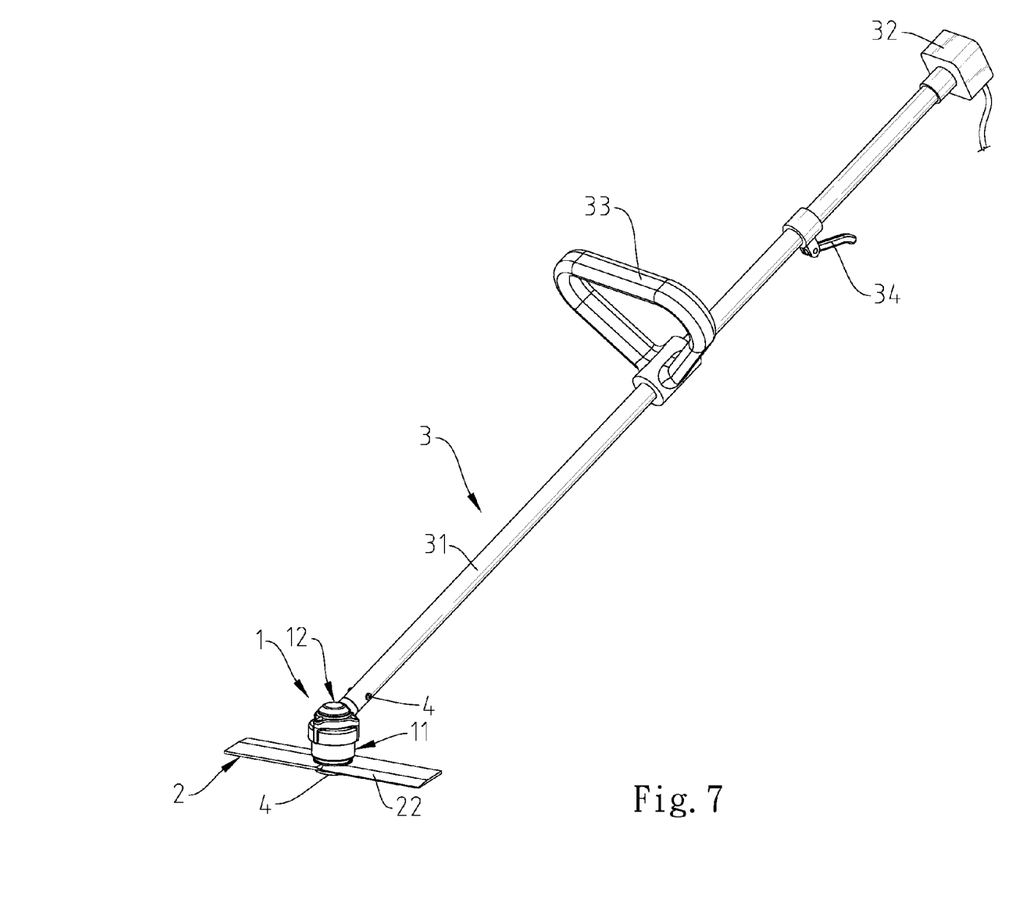
FIG. 7 is an elevational view of a direct drive electric lawn mower in accordance with a second embodiment of the present invention.

Referring to FIG. 7, a direct drive electric lawn mower in accordance with a second embodiment of the present invention is shown. This second embodiment is substantially similar to the aforesaid first embodiment with the exception that the cutting device 2 includes a blade 22 instead of the rotary cutter 21. When the on/off switch 34 of the operating device 3 is operated to start the external rotor electric motor 11 of the driving device 1, the rotor 112 of the external rotor electric motor 11 is driven to rotate the bottom cover 114 and the shaft 115, thereby moving the blade 22 to cut a lawn at an even height.

What the invention claimed is:

1. A direct drive electric lawn mower, comprising:
   a driving device comprising an electric motor comprising:
   a holder;
   a stator held by said holder;
   a rotor arranged around said stator;
   a bottom cover connected to a bottom side of said rotor so that said bottom cover is rotatable by said rotor; and
   a shaft comprising a first portion extending in said holder and a second portion extending beyond said bottom cover;
   a cutting device arranged around the second portion of said shaft;
   a fastening component engaged with the second portion of said shaft to press said cutting device against said bottom cover so that said cutting device is directly rotatable by said bottom cover; and
   an operating device comprising a tubular handle connected to said driving device, an electrical connector located on said tubular handle, a grip affixed to said tubular handle, and an on/off switch mounted on said tubular handle and electrically connected to said electrical connector and said electric motor.

2. The direct drive electric lawn mower as claimed in claim 1, wherein said stator comprises an axial mounting hole and a locating groove in a wall of said axial mounting hole;
   wherein said holder comprises a center tube inserted into said axial mounting hole and a locating groove in the periphery of said center tube;
   wherein said driving device further comprises a key fitted in said locating grooves to prevent said stator from rotating relative to said holder.

3. The direct drive electric lawn mower as claimed in claim 1, wherein said rotor comprises an annular shell arranged around said stator and a plurality of magnets equiangularly inserted in said annular shell and kept in proximity to the periphery of said stator;
   wherein said bottom cover comprises a flat body attached to a bottom side of said stator and a plurality of locating rods extending from said flat body into said annular shell, wherein said locating rods are alternatively arranged with said magnets.

4. The direct drive electric lawn mower as claimed in claim 1, wherein said holder comprises a center tube sleeved onto said shaft and inserted through said stator and two bearings inserted in said center tube to support said shaft in said center tube.

5. The direct drive electric lawn mower as claimed in claim 4, wherein said electric motor further comprises a connector fastened to a top end of said shaft and supported on one of said bearings at said holder.

6. The direct drive electric lawn mower as claimed in claim 1, wherein said bottom cover comprises a cross-notched center hole for the passing of the second portion of said shaft;
   wherein said electric motor further comprises a limiter pin transversely fastened to the second portion of said shaft and inserted in said cross-notched center hole to prohibit rotation of said shaft relative to said bottom cover.

7. The direct drive electric lawn mower as claimed in claim 1, further comprising a connection member comprising:
   a shield comprising a plurality of mounting apertures;
   fastening components inserted in said holder through said mounting apertures so that said shield is secured to said holder; and
   a shank formed on said shield and arranged around and connected to said tubular handle of said operating device.

8. The direct drive electric lawn mower as claimed in claim 1, wherein said cutting device comprises a rotary cutter comprising a wheel pressed against and directly rotatable by said bottom cover and a plurality of ropes connected to said wheel.

9. The direct drive electric lawn mower as claimed in claim 1, wherein said cutting device comprises a blade pressed against and directly rotatable by said bottom cover.

10. A direct-drive electric lawn mower comprising:
    a driving device comprising an electric motor comprising:
    a holder;
    a stator held by said holder;
    a rotor comprising an annular shell arranged around said stator and magnets evenly mounted on an internal side of said annular shell; and
    a bottom cover connected to a lower side of said annular shell so that said bottom cover is rotatable by said rotor;

a shaft comprising a first portion extending in said holder and a second portion extending beyond said bottom cover; and a cutting device arranged around the second portion of said shaft;

a fastening component engaged with the second portion of said shaft to press the cutting device against said bottom cover so that said cutting device is directly rotatable by said bottom cover; and an operating device comprising a tubular handle connected to said driving device, an electrical connector located on said tubular handle, a grip connected to said tubular handle, and an on/off switch connected to said tubular handle and electrically connected to said electrical connector and said electric motor.

11. The direct drive electric lawn mower as claimed in claim 10, wherein said stator comprises an axial mounting hole and a locating groove in a wall of said axial mounting hole, wherein said holder comprises a center tube inserted into said axial mounting hole and a locating groove in the periphery of said center tube, wherein said driving device further comprises a key fitted in said locating grooves to prevent said stator from rotating relative to said holder.

12. The direct-drive electric lawn mower according to claim 10, wherein said bottom cover comprises a flat body located below said stator and locating rods formed on said flat body and alternatively arranged with said magnets.

13. The direct drive electric lawn mower as claimed in claim 10, wherein said holder comprises a center tube sleeved onto said shaft and inserted through said stator and two bearings inserted in said center tube to support said shaft in said center tube.

14. The direct drive electric lawn mower as claimed in claim 10, wherein said bottom cover comprises a cross-notched center hole, wherein the second portion of said shaft extends through the cross-notched center hole, wherein said electric motor further comprises a limiter pin transversely fastened to the second portion of said shaft and inserted in said cross-notched center hole to prohibit rotation of said shaft relative to said bottom cover.

15. The direct-drive electric lawn mower according to claim 10, further comprising a connection member comprising:

a shield connected to said holder of said electric motor; and a shank formed on said shield and fixedly connected to said tubular handle of said operating device.

16. The direct-drive electric lawn mower according to claim 10, wherein said cutting device comprises a wheel pressed against and directly rotatable by said bottom cover and ropes connected to said wheel.

17. The direct-drive electric lawn mower according to claim 10, wherein said cutting device comprises a blade pressed against and directly rotatable by said bottom cover.

\* \* \* \* \*